United States Patent [19]

Prange

[11] 3,887,163

[45] June 3, 1975

[54] APPARATUS FOR INSERTING CABLE OR THE LIKE IN CONDUITS

[75] Inventor: Charles J. Prange, Cridersville, Ohio

[73] Assignee: Rockwell International Corporation, Pittsburgh, Pa.

[22] Filed: Dec. 10, 1973

[21] Appl. No.: 423,437

[52] U.S. Cl.... 254/134.3 FT; 15/104.3 SN; 242/156
[51] Int. Cl.............................................. H02g 1/00
[58] Field of Search............ 254/134.3 FT, 134.3 R;
214/338; 15/104.3 R, 104.3 SN; 242/54 R,
156; 226/49, 195

[56] References Cited
UNITED STATES PATENTS

| | | | |
|---|---|---|---|
| 2,659,540 | 11/1953 | Sketchley | 15/104.3 SN |
| 2,780,419 | 2/1957 | Hall | 242/156 |
| 3,152,770 | 10/1964 | Myers | 242/54 R |
| 3,176,335 | 4/1965 | Ciaccio et al. | 15/104.3 SN |
| 3,394,422 | 7/1968 | Siegal | 15/104.3 SN |
| 3,658,270 | 4/1972 | Slaton et al. | 242/54 R |
| 3,774,827 | 11/1973 | Graybeal | 254/134.3 FT |

*Primary Examiner*—Al Lawrence Smith
*Assistant Examiner*—Robert C. Watson

[57] ABSTRACT

Apparatus for feeding rod into and retrieving from a conduit in which is provided a carriage, a reel rotatably mounted on the carriage, a length of rod adapted to be wound and unwound for the reel feed rolls engaging the rod, a first motor to drive the feed rolls to feed the rod into the conduit, a second motor to drive said reel to retract the rod from the conduit.

6 Claims, 8 Drawing Figures

PATENTED JUN 3 1975 3,887,163
SHEET 1
Fig. 1.
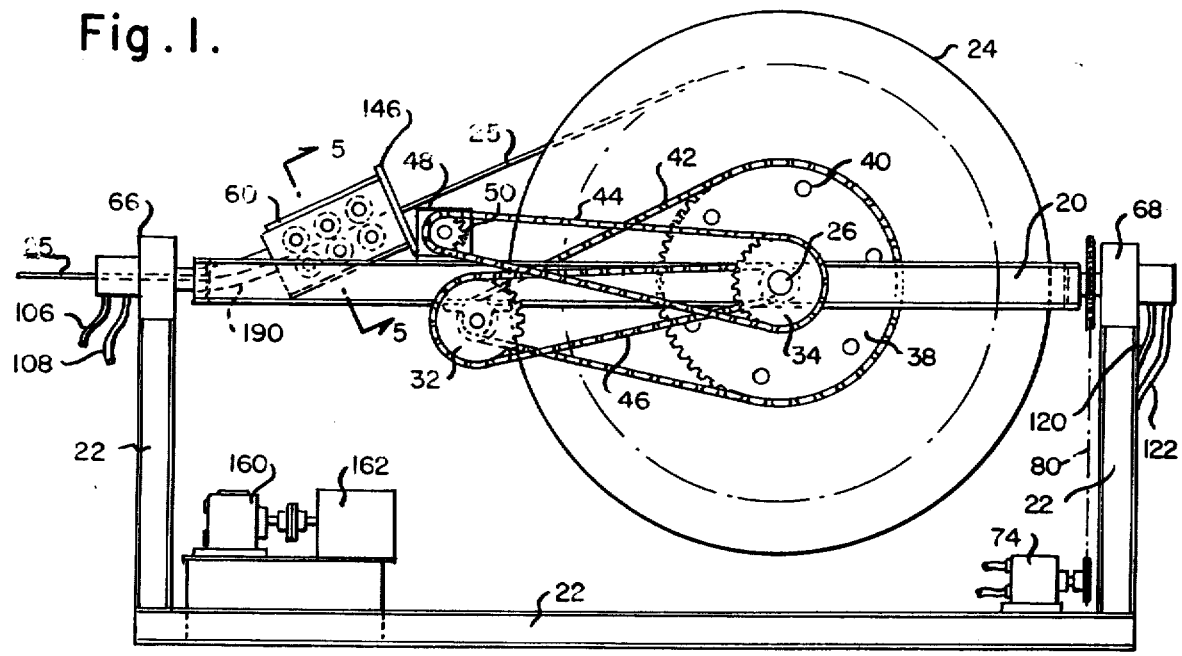
Fig. 2.
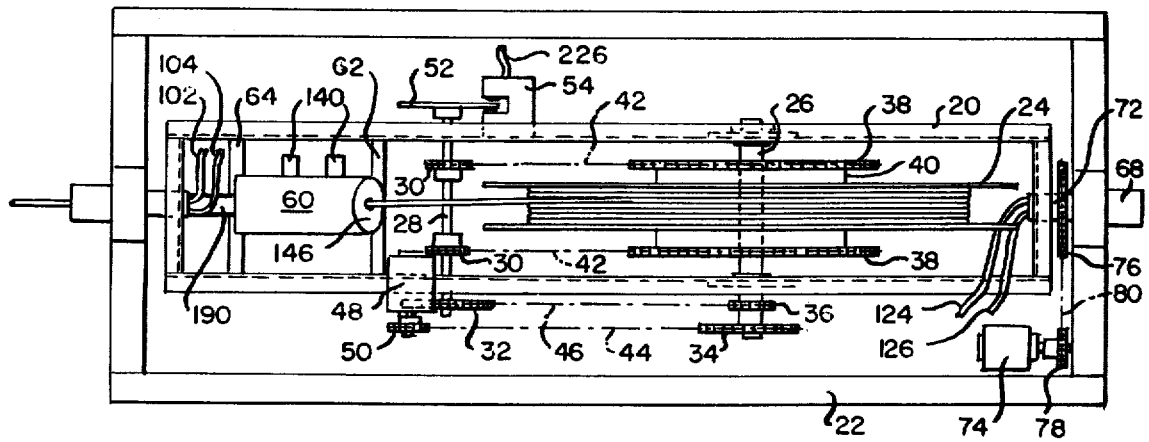
Fig. 7.
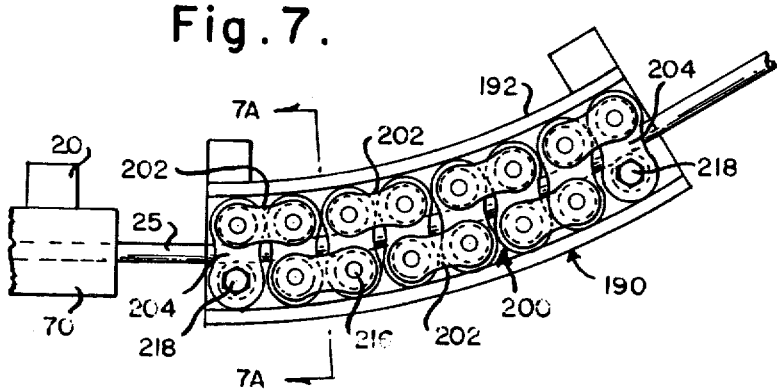
Fig. 7A.

APPARATUS FOR INSERTING CABLE OR THE LIKE IN CONDUITS

BACKGROUND OF THE INVENTION

In laying underground cable particularly telephone cable, it is the practice to dig a trench of the desired depth and to lay a number of separate parallel pipes into which the cables are to be inserted. The trenches are then filled in and manholes are located at the desired intervals, sometimes at considerable distances apart from which the cables will be inserted and serviced. In accordance with present practice, a conventional rodding machine is located at one of the manhole sites and the rod is fed into a tube until it reaches the other end of the pipe at the next manhole. A relatively small diameter corrosion resistant metal line called a "fish line" is then secured to the end of the rod at that manhole site and the rod is then retrieved and the fish line is pulled through the pipe back to the first manhole site. Sometimes cables will not be strung when the fish lines are strung but rather fish lines are strung in anticipation of inserting the cables at some future date.

When it is desired to insert the cables a winch machine is brought to one of the manhole sites and a cable truck having a supply of cable is located at the other manhole site. One end of the fish line at the cable truck is then secured to the end of a large pull cable or wire rope which may be one-half inch or more in diameter. The other end of the fish line is connected to the winch machine and the wire rope is then pulled through the pipe, the fish line disengaged from the pull cable, the pull cable connected to the winch and the telephone cable secured to the other end of the pull cable. The winch machine then pulls the pull cable and the telephone calls through the pipe.

Obviously this is a time-consuming, expensive and a multiple step procedure and it has therefore been proposed to use known rodding machines of the types shown for example in the Patents to Ciaccio No. 3,393,415, Stewart No. 3,098,251, Ciaccio, et al. No. 3,176,335, Caperton, No. 3,469,273 and Quick No. 2,167,087 to insert a rod into one end of a conduit and to pull the cable through from the other end of the rod by retrieving the rod. Such machines either feed the rod into the conduit and retrieve it by means of power driven rollers which drivingly engage the rod at a point just in front of the reel of which the rod is wound, the reel being left free to unwind or wind at will or alternatively power is applied to the reel to feed and retrieve the rod. In the case of machines in which the effort to feed and retrieve the rod is supplied by power driven rollers the amount of radial force with which the rollers engage the rod must be limited. Use of radial forces above a certain level will adversely affect the strength of the rod resulting in excessive rod breakage. Thus the amount of thrust which the rollers are able to impart to the rollers is sufficient to feed the rod into the conduit for reasonable distances; however, it has been found that to retrieve the rod and pull the heavy cable through the conduit would require a thrust to be imparted to the rod which would be of a magnitude which would adversely affect the strength of the rod to the point where rod breakage would result.

On the other hand machines which insert the rod into the conduit and retrieve the rod and pull the cable through the conduit by means of power supplied to the reel have likewise been found unsatisfactory. In such machines, without some means to prevent unravelling of the rod on the reel very little outfeed thrust can be imparted to the rod. Also, when the rod is wound on the reel it is placed under tension and it is necessary to maintain this tension on the rod in order to maintain the rod in an upsprung and manageable condition. This is true at all times but is particularly important during the outfeed operation. Typical of those machines utilizing power driven reels to feed the rod into and retrieve the rod from the conduit are shown in U.S. Patents to Quick No. 2,167,087 and Stewart, Jr. No. 3,098,251, both of which show complicated and costly means to keep the rod tightly wrapped and under tension on the reel. Despite the use of such complicated and costly tension maintaining means such machines have been found to function with indifferent success. Not only are they expensive and require frequent repair, but only a limited amount of outfeed thrust can be imparted to the rod before the rod loses its tension and becomes unsprung on the reel.

The U.S. Pats. to Sketchley No. 2,488,039 and 2,659,540 show sewer cleaning machines which feed rod into the conduit by means of power driven rollers and retrieve the rod by means of a power driven reel. In U.S. Pat. No. 2,488,039 the feed rollers are disengaged from the rod when the reel is driven to retrieve the rod from the conduit while in U.S. Pat. No. 2,659,540 the rollers are driven in a reverse direction to augment the force of the power driven reel during the rod retrieval operation. In this latter case, however, because the lineal speed of the rod varies as it is wound on the reel, it is necessary to drive the feed rollers through a complicated and relatively expensive differential roller drive mechanism which compensates for the difference in the rate of withdrawal of the rod from the conduit. In the present invention, the outfeed rollers remain engaged during retrieval of the rod do not impart any drive effort to the rod; instead the rollers are driven by the passage of the rod therethrough so that the motors which are drive connected to the rollers act as a pump and impart a restraining force to the rod to insure that tension is maintained on the rod as it is wound on the reel.

SUMMARY OF THE INVENTION

In accordance with the present invention the rod is carried on a reel which is rotatably mounted on a carriage. Feed rollers driven by motor means are provided just forward of the reel, the rollers engaging the rod with sufficient radial force to impart sufficient outfeed thrust to feed the rod into the conduit. The rod is then fed into the conduit by energizing the feed roller motor means until the free end of the rod emerges from the other end of the conduit. The end of the cable which is to be pulled into the conduit is then secured to the free end of the rod. A separate motor, drive connected to the reel is then energized to drive the reel in a direction to retrieve the rod from the conduit and to pull the cable through the conduit. Since the thrust to retract the rod and pull the heavy cable through the conduit is provided by the reel, the thrust imparted by the outfeed rollers to the rod need only be sufficient to insert the rod into the conduit; therefore, the radial force imposed on the rod by the rollers need not exceed the allowable maximum limit. During the outfeed operation a reduced pressure is applied to the reel motor tending to urge the reel in a direction to wind the rod on the roller. This pressure is less than normal to perform the winding operation and is not sufficient to overcome the outfeed thrust of the rollers but is sufficient to provide a drag on the rod thereby maintaining tension on the rod during the outfeed operation. During the winding operation the rollers remain in engagement with the rod and the roller motors act as pumps to provide a drag on the rod during the winding operation. A reel brake is held out of engagement with the reel while a normal level of fluid pressure is supplied to either the outfeed roller motor on the reel motor. When the pressure level supplied to either the roller motor or the reel motor is interrupted or reduced the brake automatically engages the reel to prevent further rotation thereof. Since the rollers are engaged with the rod at all times tension is maintained on the rod when such pressure reduction or interruption takes place.

Accordingly, it is an object of this invention to provide a machine for inserting and retrieving rod from a conduit in which the outfeed thrust is supplied by outfeed rollers and the rod is retrieved by driving the reel to wind the rod thereupon, the rollers and the reel being driven by separate motors. Another object is to provide a rodding machine having outfeed rollers and a reel each driven by separate hydraulic motors, the outfeed roller motor operating to impose a drag on the rod during the rod winding operation. Another object is to provide a rodding machine having outfeed rollers and a reel, each driven by separate hydraulic motors the reel motor operating to place a drag on the rod during the rod outfeed operation. A further object is to provide a rodding machine having outfeed rollers and a reel each driven by a separate motor means and a reel brake which is inoperative during the outfeed or winding operation but operative to prevent rotation of the reel when the power supplied to either motor means is interrupted or released below normal level. Still another object is to provide a novel rod guide structure which guides the rod in a desired arc of curvature as it is wound on and unwound from the reel. Another object is to provide means to minimize the chances of rod breakage betweeen outfeed rollers and the reel. A still further object is to provide a novel, quick, relatively inexpensive method to insert cable into conduit.

DESCRIPTION OF THE DRAWINGS

FIG. 1 is a side elevation view of the rod feed and retrieving apparatus of the instant invention.

FIG. 2 is a top plan view of the apparatus of FIG. 1.

FIG. 7 is a side elevation of the roller guide.

FIG. 7A is a sectional view of the roller guide taken along the lines 7A—7A of FIG. 7.

DESCRIPTION OF THE PREFERRED EMBODIMENT

Figure 3:
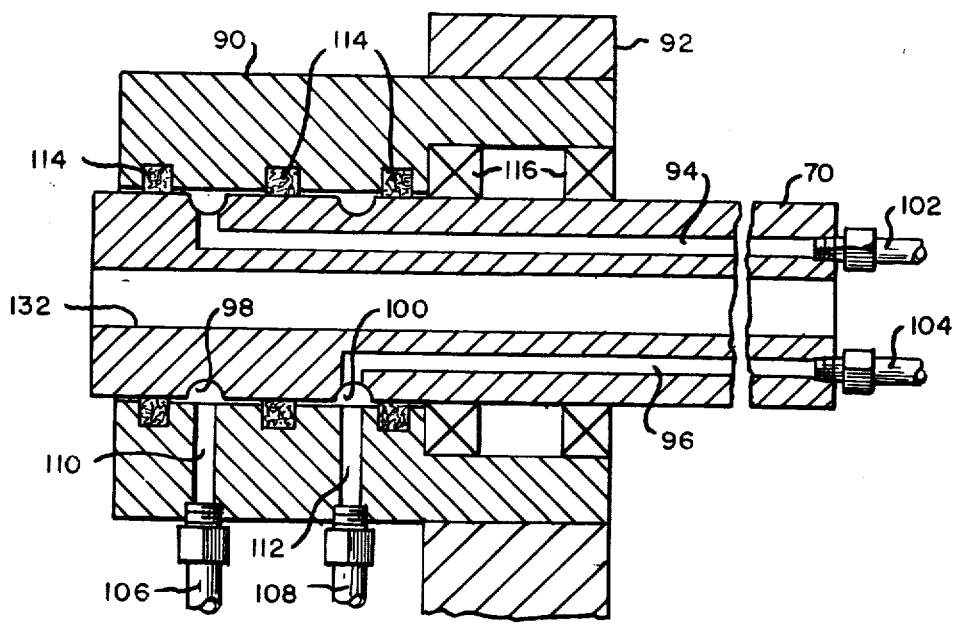
FIG. 3 is a sectional view in elevation of the front gland taken along the lines 3—3 of FIG. 2.

Referring now to the drawings and in particular to FIGS. 1 and 2, a carriage 20 is mounted at its respective ends for rotation about its longitudinal axis on a frame denoted generally by the numeral 22. A reel 24 for storing the rod 25 in its periphery is mounted on shaft 26 which in turn is journalled for rotation on carriage 20 about an axis trasverse to the axis of rotation of carriage 20. Forwardly of the reel 24 a shaft 28 is journalled for rotation on carriage 20 about an axis transverse to the axis of rotation of shaft 26. Sprockets 30 and a relatively large sprocket 32 are mounted on shaft 28 for rotation therewith. A unitary assembly comprising sprockets 34 and 36 is mounted for rotation on shaft 26 outboard of the carriage 20. Thus the sprockets 34 and 36 rotate together and the unitary assembly "floats" on the shaft 26. Relatively large reel sprockets 38 are secured to reel 20 for rotation therewith about the axis of shaft 26 by means of studs 40. Sprockets 38 are aligned with sprockets 30 on shaft 28 and are drive connected thereto by means of chains 42. Hydraulic motor 48 has a sprocket 50 fixed on the end of its output shaft and is mounted on the carriage 20 with the sprocket 50 being aligned with the sprocket 34, the sprockets 50 and 34 being drive connected by means of chain 44. When hydraulic fluid under pressure is supplied to motor 48 sprocket 50 drives the assembly made up of sprockets 34 and 36, which is free to rotate on shaft 26, and the sprocket 36 through chain 46 drives sprocket 32 and shaft 28 about its axis. Sprockets 30 through chains 42 then drive sprockets 38 and reel 24 causing it to rotate about the axis of shaft 26 in a direction to wind the rod 25 on the reel 24. Outboard of carriage 20, a brake disc 52 is secured to shaft 28 for rotation therewith. A brake mechanism 54 is mounted on carriage 20 in a position to apply a braking effort to the disc 52 when operated in a manner hereinafter to be described. Roller feel head 60 hereinafter described in detail is fixed on cross members 62 and 64 extending laterally of and secured to the carriage 20.

The carriage 20 and all of the elements mounted thereon as hereinabove described is mounted for rotation about its longitudinal axis on frame 22 by means of glands 66 and 68 in which are rotatably mounted shafts or gland cores 70 and 72 secured to the opposite ends of carriage 20. A second hydraulic motor 74 has a sprocket 78 secured to its output shaft and is secured to frame 22 in a position whereby the sprocket 78 is aligned with sprocket 76 concentrically secured to gland core 72. A chain 78 drive connects sprockets 78 with 76 so that when hydraulic fluid under pressure is supplied to motor 74 the sprocket 78 drives sprocket 76 to rotate the carriage 20 and all of the elements mounted thereon about the axis of shaft or gland cores 70 and 72.

Glands 66 and 68 are of the type shown in Pat. No. 3,176,337, glands 66 and are shown in detail in FIG. 3 herein. Rotary coupling gland 66 comprises a casing 90 suitably mounted in pillow block 92 which may be formed integrally with or secured to the frame 22. Shaft 70 constitutes a gland core, has axially extending radially spaced passages 94 and 96 therein and respective annular passages 90 and 100 communicating respectively with passages 94 and 96 near the outer end thereof. As shown, the inner ends of passages 94 and 96 are respectively connected to hydraulic fluid lines 102 and 104. Hydraulic fluid lines 106 and 108 are respectively connected to annular fluid passages 98 and 100 by means of passages 110 and 112 formed in casings 90. The fluid system comprised of passages 94 and 98 on one hand and passages 96 and 100 on the other hand are fluid pressure sealed from each other by means of "O" ring seals 114. The forward end of carriage 20 is mounted on the inner end of gland core 70 which in turn is journalled for rotation in casing 65 by means of bearings 116. The core 70 of forward gland 66 has a centrally located axially extending passage 132 through which extends the rod 25 as it is wound and unwound from the reel 24 through feed head 60.

The rear end of the carriage 20 is likewise rotatably mounted on frame 22 by means of gland 68 which except for central passage 132 is similar to gland 66, with hydraulic fluid line 120 communicating with passages corresponding to passage 104, 108 and 96 and with fluid line 122 being connected to passages corresponding to passages 102, 106 and 94. One end of line 124 communicates with the inner end of a passage corresponding to passage 102 in core 70 and one end of fluid line 126 communicates with a passage corresponding to passage 104 of core 70. The other ends of lines 124 and 126 are connected to motor 48.

Figure 4:
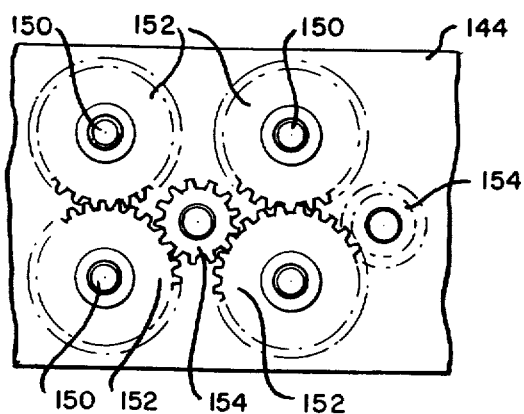
FIG. 4 is a fragmentary side elevation of the roller feed apparatus.
Figure 5:
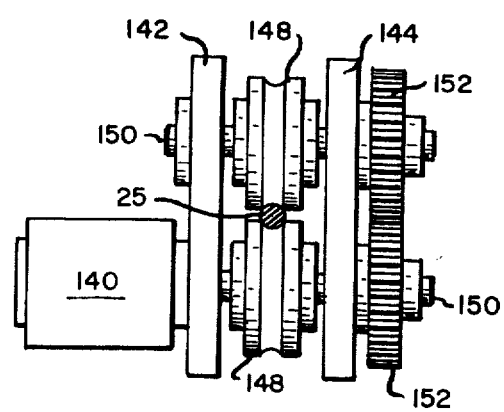
FIG. 5 is a sectional view of the roller feed apparatus taken along the lines 5—5 of FIG. 1.

In order to feed the rod 25 from the reel 24 through passage 132 in gland 66 and into the underground duct through which the telephone cable is to be pulled a roller feed head 60 is provided which in structure and operation is similar to that shown in U.S. Pat. No. 3,176,335 and the details of which are shown in FIGS. 4 and 5 herein. The feed head 60 may comprise generally a pair of parallel, laterally spaced side plates 142 and 144 secured at one end to cross member 64 and to the other end to round plate 146 which in turn is secured to cross member 62. Between side plates 142 and 144 are several pairs of feed rolls 148 having shafts 150 journalled in line extending through plates 142 and 144. On one side of the roller feed head the shafts 150 are coupled by meshing spur gears 152 connected in a train by pinions 154. Hydraulic motors 140 are mounted on side plates 142 and directly drive connected to two of the shafts 150. Thus, when fluid pressure is supplied to the motors 140 the opposed upper and lower rollers 148 which drivingly engage the rod 25 between them pull the rod off the reel and feed it into guide 200 the details of which are described herewith.

In order to eliminate any bending of the rod 25 between the feed head 60 and the point where the rod leaves the reel, it will be noted from FIG. 1 that feed head 60 is mounted on carriage 20 at an angle so that the feed thrust exerted by the feed head on the rod 25 is substantially tangential to the periphery of the reel. The rod 25 therefore emerges from feed head 60 at an angle with respect to the axis of rotation of gland core 70 and its direction of travel must be changed before the rod enters passage 132 in core 70. Otherwise stated the rod must travel through an arc between the feed head 20 and gland 70 so that it will move axially through the passage 132. To accomplish this the rod is guided in an arc of curvature by guide 190 which is shown in enlarged detail in FIGS. 7 and 7A. Shown there is a U-channel member 192 which is formed so that the axis of its channel corresponds to the desired arc of curvature along which the rod is to be guided. The channel 192 comprises upper and lower walls 194 and 196 respectively and back wall 198 all of which are formed to correspond to the desired arc of curvature.

A chain element identified generally by the number 200 is made up of a series of outer lines 202 and a series of inner links 204 pivotally interconnected in a manner similar to that employed in drive chain for sprockets.

Extending between the opposed ends of a series of two parallel inner links 204 are rollers 212 and 214. Parallel outer links 202 extend between and are pivotally connected to successive series of inner links 202. Each pair of outer links is pivotally connected to successive pairs of inner links by means of pins 216 which are press fitted into aligned openings in outer links 202 and project through similar aligned openings in inner links 204 and serve to connect adjoining ends of alternate pairs of outer links 202 and inner links 204 to allow pivotal movement between the adjoining pairs of outer and inner links and to allow the rollers to rotate on the pins 216. The chain 200 is secured within the channel of guide channel 192 by screws 218 which extend through the ends of both pair of links and the rollers therebetween at each end of the chain and are threaded into wall 198. The length of links 202 and 204 are preferably the same and corresponds generally to the distance between walls 196 and 194. When a chain of appropriate length is fixed in the guide channel in the manner above described, successive pairs of links may be angularly positioned with respect to each other in the manner shown whereby alternate pairs of links are positioned lengthwise along opposed walls 194 and 196 with the pairs of links connecting such alternate pairs of links being oriented generally transversely of the channel between the walls 194 and 196. With the chain so positioned the series of spaces between the rollers which are mounted between each end of the pairs of links positioned transversely of the channel define a path of the desired arc of curvature bounded on either side by a series of rollers which guide the rod 25 through the desired arc of curvature.

Figure 6:
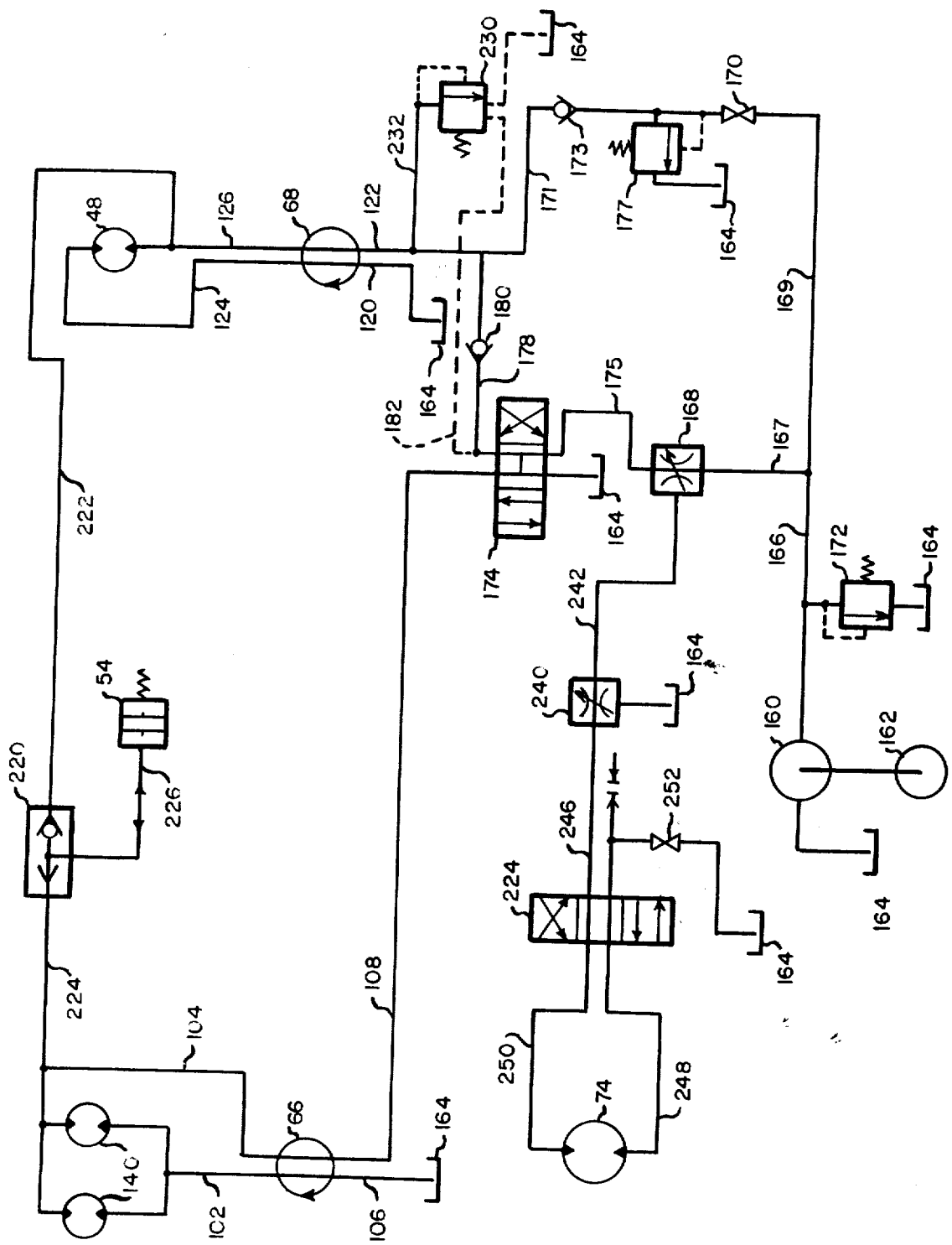
FIG. 6 is a schematic diagram of the hydraulic circuit showing the various elements utilized to drive and control the apparatus of the instant invention.

FIG. 6 is a schematic diagram of the hydraulic circuit including the drive elements and controls therefore utilized to control the supply of pressure fluid to the drive motors which drive the reel 24, the roller feed head 60, the rod 24, carriage 20 and to disengage the brake 54. A motor or engine 162 which may be gasoline powered or adapted to be powered by any convenient source of energy, drives an hydraulic pump 160 the intake of which is connected to reservoir 164. The output of pump 160 is connected to a flow divider 168 through lines 166 and 167 and to a needle valve 170 by means of lines 166 and 169. A relief valve 172 is connected to line 166 upstream of flow divider 168 and needle valve 170 which in case of excess pressure in the output of pump 160 will operate in a well known manner to open and return the fluid to reservoir 164 thus preventing damage to any of the hydraulic elements connected in the circuit downstream of the relief valve 172. Normally in operation the needle valve 170 is only cracked open slightly to allow only a slight amount of hydraulic fluid to pass therethrough for a purpose which will be hereinafter described. Thus most of the output from the pump 160 will be applied to the flow divider 168 with no significant reduction in pressure.

Flow divider 168 is a commercially available item which has an input and two outputs, $C_1$ and $E_1$. These flow dividers operate to produce a controlled variable output from output C which for any given setting of the divider controls remains constant in volumetric rate with any variations in input volumetric rate, so long as the input rate remains equal to or more than the output rate for which the controlled output is set. The excess output E is then the difference between the input rate and the controlled output rate. The controlled output $C_1$, of flow divider 168 is connected to one of four ports in a four way main control valve 174. One of the ports is connected to reservoir 164, one to line 108 and one to line 182 and line 178 which in turn communicates with line 122. One way check valve is located in line 178 to allow fluid to flow from valve 174 to line 122 but prevents fluid flow in a reverse direction.

The control element of main control valve 174 has three positions, the mid position of which, depicted in FIG. 6, operates to connect the controlled output of flow divider 168 directly to reservoir 164. When the control element of valve 174 is moved to the position depicted by the parallel arrows, output $C_1$ of the flow divider 168 will be connected to lines 182, 178 and 122. In this condition of the valve hydraulic fluid under pressure will be supplied from the pump 160 through control flow divider 168 and valve 174 through conduit 178 and one-way check valve 180 to line 122 to gland 68, through lines 126 to the motor 48 to operate the motor to wind rod 25 on the reel. Fluid exhausted from motor 48 until flow through line 124 through gland 68 line 120 to reservoir 164. At the same time lines 104, and 224 will be connected to reservoir 164 through line 108 and valve 174. When the control element of valve 174 is moved to the position depicted by the crossed arrows output $C_1$, flow divider 168 will be connected to line 108 and hydraulic fluid under pressure will be supplied from pump 160 through flow divider 168 and valve 174, line 108 gland 66 line 104 to motors 140 to operate these motors in a direction to cause feed head 60 to feed the rod 25 from the reel through the passage 132 in gland 66. Fluid exhausted from motors 140 will be returned to reservoir 164 through line 102 gland 66 and line 106. At the same time lines 182 and 178 and the lines communicating therewith are connected to reservoir 164.

Brake 54 shown schematically in FIG. 6 and in FIG. 1 is of the type which is spring biased into braking equipment with brake disc 52 but is disengaged therefrom when fluid pressure is supplied to line 226. Shuttle valve 220 shown schematically in FIG. 6 has one outlet and two inlets, one inlet being connected to line 126 by means of line 222, the other inlet being connected to line 104 by means of line 224. The outlet is connected to brake 54 by means of line 226. Essentially shuttle valve 220 comprises a double one-way check valve which operates in a well known manner to connect line 22 to outlet 226 and close the inlet to which line 224 is connected when lines 222, 126, 122 and 178 are connected to the controlled output $C_1$, of flow divider 168. Similarly when main control valve 174 is positioned to connect line 108 to the controlled output $C_1$, of flow divider 168 and line 178 to the reservoir, lines 104 and 224 are supplied with pressure fluid which causes shuttle valve 220 to connect line 224 to line 226 and close the inlet to which line 222 is connected. Thus it will be seen that so long as fluid pressure is supplied to either line 222 or 224 fluid pressure will be applied to brake 54 and it will be disengaged from brake disc 52. Only when no fluid pressure is supplied to either line 224 or 222 will the brake disc 52 be engaged and the reel 24 locked against rotation.

The outlet of needle valve 170 communicates with line 178 through line 171 in which is located one-way check valve 173 to allow fluid to flow from valve 170 to line 178 but prevents reverse flow. Also connected to line 171 is a relief valve 177 which is spring biased closed but will open to connect lines 171 to reservoir 164 is the pressure in line 171 exceeds a certain value for which the relief valve 177 has been set. It is therefore the setting on relief valve 177 which controls the level of pressure applied to line 122 and therefore to motor 48 when line 178 is connected to the reservoir during the rod outfeed operation when rod is being unwound from the reel.

A pilot controlled relief valve 230 has its inlet in communication with line 122 through line 232 and its outlet is connected to reservoir 164. Pilot line 182 extends from the control portion of pilot relief valve 230 to line 178 at a point between main control valve 174 and one way check valve 180. Relief valve 230 is lightly spring biased to a closed position. Its mode of operation is such that when fluid pressure is supplied to line 178 through control valve 174 to drive motors 48 in a direction to wind rod thereon, this pressure will be communicated to the control portion of the valve through line 182 and operates to augment the force of the spring to hold the valve closed and prevents the escape of fluid from line 122 and 178 to the reservoir 164 through valve 230. However, when main valve 174 is positioned to supply fluid pressure to drive outfeed motors 140 line 178 is connected to the reservoir and the pressure in lines 178 and 182 is relieved. When motors 140 are operated by unwind rod from the reel 24, motor 48, drive connected thereto, acts as a pump which takes its suction from reservoir 164 through lines 120, gland 68 and line 124 and generates a fluid pressure in lines 126, 122 and 232 which is sufficient to overcome the force of the biasing spring in valve 230. Since line 178 is connected to reservoir 164 through main control valve 174 the pressure in 182 is relieved and the pressure in line 232 overcomes the light spring bias and causes the valve 230 to open and connect line 232 to reservoir 164.

As explained above the flow divider 168 has two outputs a controlled output $C_1$, and an excess output $E_1$, which is connected to the inlet of a second flow divider 240 by means of line 242. In the same manner as flow divider 168, flow divider 240 also has two outputs, a controlled output $C_2$ and an excess output $E_2$ the latter of which is connected to reservoir 164. Output $C_2$ is connected to one of four ports of a four way control valve 244 through line 246. Hydraulic carriage drive motor 74 is connected to two of the ports of valve 244 through lines 248 and 250 and the remaining port of valve 248 through lines 248 and 250 and the remaining port of valve 248 is connected to reservoir 164 through valve 252. Like main control valve 174, the movable control member of valve 244 has three positions. In its mid position as depicted in FIG. 6 the ports to which lines 246 and the reservoir 164 are connected are placed in communication and any fluid under pressure issuing from output $C_2$ of flow divider 240 is diverted directly to the reservoir. When the control element of valve 244 is positioned in the position depicted by the parallel arrows, line 246 communicates with line 250 and line 248 is connected to the reservoir and any fluid under pressure issuing from outlet $C_2$ will drive motor 74 in one direction and when the control element of valve 244 is positioned in the position depicted by the crossed arrows, line 246 will be connected to line 248 and line 250 will be connected to the reservoir and 74 will be driven in the opposite direction. The apparatus hereinabove described is munted on a truck or trailer so that it may be transported easily from site to site, usually a manhole where access may be had to conduit where the rod is to be inserted, either for the purpose of cleaning the pipe or stringing telephone or other electric cable. Engine 162 is started or alternatively pump 160 may be drive connected to the truck engine. The control element of valve 174 is positioned to place the valve in the condition depicted by the crossed arrows thereby connecting output $C_1$, of flow divider 168 and line 175 in communication with the line 108. At the same time lines 178 and 182 are connected to the reservoir 164. Fluid under pressure form pump 160 is supplied through lines 166, 167, flow divider 168, lines 175 and 108, gland 66 and line 194 to motors 140 to rotate the motors in a direction to cause the roller feed head 60 to unwind rod 25 from reel 24 and feed it through gland 66 into the conduit. Exhaust fluid from the motors 140 is returned to reservoir 164 through lines 102 gland 66 and line 106. During this phase of the operation fluid pressure is supplied to brake 54 through line 224, shuttle valve 220 and the line 226 to maintain the brake disengaged from the brake disc 52. Also, at this time pressure fluid from pump 160 is supplied to needle valve 179 which is opened just an amount sufficient to supply pressure fluid at a relatively low rate of flow and pressure to line 122 through line 171 and check valve 173. Check valve 180 prevents the fluid pressure in line 171 from being exhausted to the reservoir through main control valve 174.

As explained above when rod is being unwound from the reel, motor 48 acts as a pump and is driven by the reel in a direction to pump fluid from the reservoir 164 through line 120, gland 68 line 124 through motor (pump) 48, gland 68 lines 122 and 232 and through regulator 230 back into reservoir 164.

Since fluid pressure is being applied to line 122 and 126 from pump 160 through needle valve 170 pressure in the lines 122 and 126 urge the motor 48 and reel 24 to rotate in a direction to wind the rod in the reel at all times. The reel is thereby prevented from overrunning the rod and the tension is maintained on the rod on the reel and between the reel and the roller feed head 60. From time to time it may be necessary to vary the rate at which rod is being inserted into the conduit and when the rate at which the feed head is feeding rod into the conduit is reduced, due to the high inertia of the reel, without the additional load imposed on the motor 48 by the back pressure supplied through needle valve 170 the reel would overrun the rod causing it to lose tension on the reel. In such a condition the rod could become tangled on the reel requiring a discontinuance of the operation and a time consuming and tedious procedure to dis-entangle the rod.

As the rod emerges from the roller feed head 60 during the unwinding operation it is guided through the roller guide 190 to change the direction of its travel from a direction tangential to the point where the rod leaves the reel to a direction coaxial to the axis rotation of core 70 of gland 66. The rod then travels through passage 132 of core 70 and from there is directed to the conduit into which the rod is to be inserted.

After the main control valve 174 has been positioned to cause the roller feed head to begin feeding rod off the reel the control member of control valve 244 is positioned to supply pressure fluid from flow divider 240 to enter line 250 or line 248 and to connect either line 248 or line 250 to the reservoir 164 to cause motor 74 to rotate carriage 20 about the axis of glands 66 and 68 in either direction as may be desired. Thus, the rod is caused to rotate about its axis as it is fed into the conduit. As is well known this rotation facilitates the feeding of the rod through the conduit, particularly when the length of conduit to be traversed is relatively long or when obstacles to the travel of the rod are encountered.

It should be noted that flow dividers 168 and 240 incorporate control means which may be manipulated by an operator to vary the rate of the fluid emerging from the controlled outputs $C_1$ and $C_2$. Thus, the speed of rotation motors 48 and 140 are therefore the speed of travel by operator manipulation of the controls of flow divider 168 and the speed of rotation of the carriage may similarly be varied by manipulation of the controls of flow divider 240.

When the end of the rod reaches the remote end of the conduit, the control members of control valves 174 and 224 are positioned to place the valves in the condition depicted in FIG. 6. In the condition no fluid pressure is being supplied to any of the motors 48, 140 or 74 and outfeed of the rod and rotation of the carriage is stopped. However, since neither line 222 nor line 224 is under pressure at this point no fluid pressure is supplied to brake 54 and it will engage brake disc 52 under the influence of its spring bias as above explained. The reel will therefore be held against rotation in either direction by brake 54 and since the rod is still drivingly engaged by the rollers of roller feed head 60 the rod remaining on the reel will be maintained in tension.

If the operation contemplates stringing of telephone or other cable through the conduit a supply of such cable, usually on a roll or reel, will be located at the remote end of the conduit and the free end of the cable will be connected to the end of the rod by any one of several well known means which permits the reel to rotate with respect to the cable.

In order to retrieve the rod from, and to pull the cable into the conduit the control element of control valve 174 is positioned to place the valve in the condition depicted by the parallel arrows in which condition pressure fluid from pump 160 and flow divider 168 will be supplied to motor 48 through lines 178, 122, gland 68, and line 126 to drive motor 48 in a direction to wind rod onto the reel 24. Pressure fluid will also be supplied to line 182. At the same time lines 108 and 104 will be exhausted to reservoir 164 through control valve 174.

Depending on the type of operation contemplated, the control valve 244 may also at this time be operated to cause the carriage to rotate in either direction as desired. Rotation of the carriage and therefore the rod may be employed during rod retrieval in conduit cleaning operations or when long lengths of conduit are to be traversed. As soon as pressure is applied to line 126 such pressure is communicated to shuttle valve 220 by means of line 222 and the closure member of the valve is shuttled to connect line 222 to line 226 and close line 224. Brake 54 is therefore disengaged from brake disc 52 at the same time that motor 48 is operated to rotate the reel in a direction to withdraw rod from the conduit and wind it on the reel. Fluid is exhausted from motor 48 through line 124 and gland 68 and line 128 to the reservoir. Also, during this phase of the operation since fluid pressure is also supplied to pilot line 180 pilot relief valve 230 is held closed to prevent pressure fluid from line 178 and 122 being returned to the reservoir by way of lines 232 and pilot relief valve 232. Check valve 173 will prevent any reverse flow of fluid from line 178 through line 171, back to reservoir 164 by way of relief valve 177.

As the rod is withdrawn from the conduit some tension is maintained on the rod by the frictional resistance which the conduit offers to the travel of the rod, and in a cable stringing operation by the cable itself. However it has been found that the resistance to rod and cable travel afforded by the conduit is inadequate to maintain sufficient tension on the rod particularly if the winding operation is temporarily interrupted or in the case of cleaning operations as the end of the rod approaches the near end of the conduit where such resistance diminishes rapidly. In the instant invention the rollers 148 of roller feed head 60 are maintained in driving engagement with the rod during the rod withdrawal phase of the operation. Therefore as the rod is wound on the reel the rollers 148 are driven by the rod as it travels through the roller feed head 60 and the rollers drive the motors 140 which act as pumps and therefore place a restraint on roller 148 and therefore on the travel of the rod through the roller head thereby maintaining an adequate tension on the rod between roller head and reel. During this time motors 140 acting as pumps and withdraw fluid from reservoir 164 through line 106 gland 66 line 102 and return fluid to the reservoir by way of line 104 gland 66 line 108 and control valve 174.

If it becomes desirable to interrupt the retrieval operation for any reason the control member of control valve 174 is moved to its mid position to place the valve in the condition shown in FIG. 6. In this condition of the valve 174 fluid pressure will be diverted from motor 48 and the motors 140, and fluid pressure in both lines 222 and 224 will be relieved; brake 54 will therefore engage brake disc 52 locking the reel from rotation in either direction. Since the rod is still drivingly engaged by the rollers 148 tension will be maintained on the rod wound on the reel.

During interruption of the rod retrieval or winding operation, rotation of the rod may or may not be interrupted as desired. If desired, it is merely necessary to move the control member of control valve 244 to the position showing in FIG. 6 in which position the fluid from controlled output C₂ of flow divider 240 will be diverted from motor 74 and returned to the reservoir 164.

The retrieval operation may be restarted by moving the control members of the control valves 174 and 244 to the appropriate position to apply fluid pressure to the motors 48 and 74 and lines 222 at which point brake 54 will be released, reel 24 will be driven in a direction to wind rod thereon and the carriage 20 will begin to rotate.

In summary it will be noted that with apparatus embodying the instant invention, the rod is fed into the conduit of the roller feed head 60 but is retrieved by driving the reel directly. By this means sufficient torque may be applied to the reel to pull the rod and the relatively heavy cable through the conduit. As previously pointed out hereinabove long lengths if sufficient thrust were to be applied to the rod to retrieve long lengths of rod and cable by means of the roller feed head, the magnitude of the radial pressure which would be required to be imposed in the rod by the rollers 148 in order to provide such a thrust would be such that the rod would quickly become brittle and excessive rod breakage would result.

Also at all times during the outfeed and retrieval of the rod and during any temporary interruptions thereof, tension is maintained on the rod wound on the reel to prevent it becoming sprung to a loose and tangled condition.

It should also be noted that the feed head is oriented at an angle with respect to the horizontal so that the thrust and restraint imparted to the rod by the roller feed head is exerted tangentially of the point where the rod leaves the reel and the direction of travel of the rod is changed from such a tangential direction to the horizontal by the guide after the rod emerges from the roller feed head. Thus the bending action on the rod does not take place between the reel and the roller feed head where the rod is constantly under tension. Locating the guide is this manner further reduces rod breakage.

Having described a preferred embodiment of my invention, I now claim:

1. Apparatus for inserting rod into and retrieving rod from a conduit comprising a support structure, a carriage mounted on said support structure for rotation about a first axis, a reel rotatably mounted on said carriage for rotation about a second axis, a length of rod adapted to be wound on an unwound from said reel, rod drive means mounted on said carriage to feed said rod from said reel including rollers in driving engagement with said rod along a line tangent to the point where the rod diverges from said reel, guide means on said carriage adjacent to the side of said drive means from which the rod emerges when said rod is being fed from said reel to guide said rod in an arc of curvature whereby the run of said rod is changed in direction from said line of tangency to substantially the axis of rotation of said carriage, said arc of curvature having a larger radius than the arc of curvature of the rod when wound on the reel.

2. Apparatus for feeding rod into and retrieving rod from a conduit comprising a support structure, a carriage, spaced bearing means for mounting said carriage on said support structure for rotation about a first axis, a reel rotatably mounted on said carriage about a second axis transverse to said first axis, a length of rod adapted to be wound on and unwound from said reel, rod feed means fixedly mounted on said carriage for rotation therewith, first fluid motor means mounted for rotation with said carriage and drive connected to said reel, second fluid motor means mounted for rotation with said carriage and drive connected directly to said rod feed means, a fluid pump mounted on said support structure, means including gland means associated with said bearing means for conducting pressure fluid from said pump to said second fluid motor means to drive said rollers in a direction to feed said rod from said reel and to said first motor means to drive said reel in a direction to wind said rod on said reel, said first motor means being adapted to operate as a pump and thereby inhibit the rotation of said reel when said rod is being fed from said reel, said second fluid motor means being adapted to act as a pump and thereby inhibit movement of said rod feed means when said rod is being wound on said reel whereby tension is maintained on said rod between said reel and said rod feed means when rod is being fed from said reel and when rod is being wound on said reel.

3. The apparatus of claim 2 together with hydraulically responsive brake means adapted to prevent rotation of said reel.

4. The apparatus of claim 3 together with means to render said brake means inoperative when said reel is being driven by said first fluid motor means.

5. The apparatus of claim 3 together with means to render said brake means inoperative when said rod feed means is being driven by said second fluid means.

6. The apparatus of claim 3 together with means to render said brake inoperative when said reel or rod feed means are being driven by said first or second fluid motor means respectively and means automatically operable when neither said reel nor rod feed means are being driven by their respective drive means to operate said brake to prevent rotation of said reel in either direction.

* * * * *